United States Patent
Worley et al.

(10) Patent No.: US 9,158,115 B1
(45) Date of Patent: Oct. 13, 2015

(54) TOUCH CONTROL FOR IMMERSION IN A TABLET GOGGLES ACCESSORY

(71) Applicant: AMAZON TECHNOLOGIES, INC., Reno, NV (US)

(72) Inventors: Connor Spencer Blue Worley, San Diego, CA (US); John Aaron Zarraga, San Francisco, CA (US); Oliver Huy Doan, San Francisco, CA (US); Tomer Moscovich, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 50 days.

(21) Appl. No.: 14/027,982

(22) Filed: Sep. 16, 2013

(51) Int. Cl.
*G02B 27/01* (2006.01)

(52) U.S. Cl.
CPC .................... *G02B 27/0172* (2013.01)

(58) Field of Classification Search
CPC ....... G06F 3/01; G06F 3/011; G09G 2354/00; H04N 13/044; G02B 27/01; G02B 27/017; G02B 27/0172; G02B 2027/014; G02B 2027/0178
USPC ................... 345/7, 8, 9; 349/13; 359/228, 630
See application file for complete search history.

(56) References Cited

U.S. PATENT DOCUMENTS

| | | | |
|---|---|---|---|
| 6,559,813 B1 * | 5/2003 | DeLuca et al. | 345/8 |
| 7,710,655 B2 * | 5/2010 | Freeman et al. | 359/636 |
| 8,594,381 B2 * | 11/2013 | Fedorovskaya et al. | 382/107 |
| 2003/0007240 A1 * | 1/2003 | Blum et al. | 359/319 |
| 2008/0062338 A1 * | 3/2008 | Herzog et al. | 349/13 |
| 2009/0322861 A1 * | 12/2009 | Jacobs et al. | 348/53 |
| 2012/0050141 A1 * | 3/2012 | Border et al. | 345/8 |
| 2012/0086624 A1 * | 4/2012 | Thompson et al. | 345/8 |
| 2012/0218303 A1 * | 8/2012 | Nakada | 345/649 |
| 2013/0258270 A1 * | 10/2013 | Cazalet et al. | 351/114 |
| 2014/0320399 A1 * | 10/2014 | Kim et al. | 345/156 |

\* cited by examiner

*Primary Examiner* — Tom Sheng
(74) *Attorney, Agent, or Firm* — Lowenstein Sandler LLP

(57) ABSTRACT

Single-touch immersion control of head-mounted display (HMD) systems is described. One method outputs video from an electronic device to a HMD system that includes a display layer and a variable-transparency layer. The electronic device controls the variable-transparency layer to operate in a first state in which the variable-transparency layer is transparent and to operate in a second state in which the variable-transparency layer is opaque. The electronic device switches between the second state and the first state in response to a single-touch event detected by the electronic device.

20 Claims, 10 Drawing Sheets

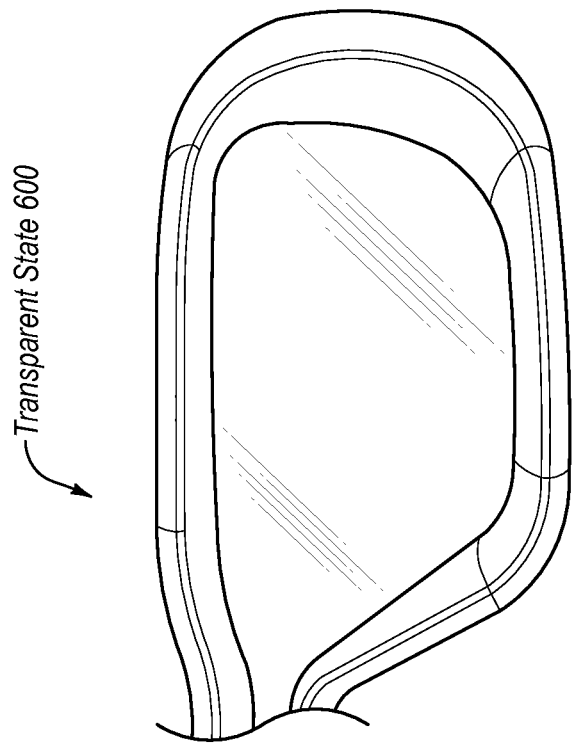
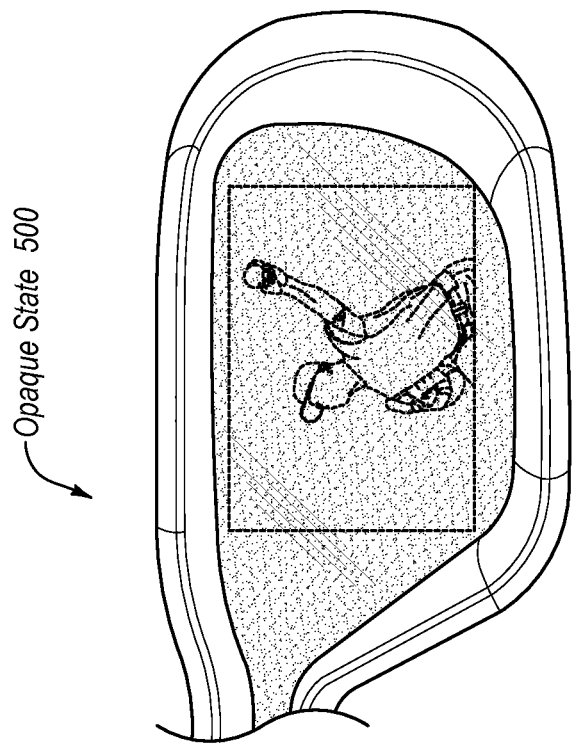

TOUCH CONTROL FOR IMMERSION IN A TABLET GOGGLES ACCESSORY

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. A basic issue with mobile devices, such as cell phones, PDAs, tables, and mobile game consoles has always been screen size. One the one hand, a large screen is beneficial for watching movies, playing games, and even reading e-mail comfortably. On the other hand, the larger the screen, the bigger the device, which may be less desirable for a light and portable product. Another problem consumers experience with portable devices, like tablet devices, is the lack of ability to immerse themselves in a tablet experience, such as watching a movie on an airplane.

One technology directed to address the size dilemma is head mounted display (HMD) systems. Conventional consumer HMD systems, such as TV glasses and virtual-reality goggles, were usually heavy, expensive and uncomfortable to use for long periods of time. More recently, lighter and more affordable products have been developed in video glasses. A HMD is a display device that is worn on the head, such glasses or goggles or that is part of a helmet. The HMD has display optics, such as lenses, which are placed in front of one or both eyes of a user. The HMD may have one display or two miniaturized displays, such as liquid crystal display (LCD), Liquid Crystal on silicon (LCos), or organic light-emitting diode (OLED).

There are some HMD systems with opaque lenses and some HMD systems with transparent lenses (also referred to as optical HMD systems or smart glasses). The opaque systems do not readily allow a user to reengage with the outside world without physically moving or removing the HMD system. On the other hand, the transparent systems do not allow a user to immerse in the experience.

BRIEF DESCRIPTION OF THE DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 5 illustrates a lens of a HMD system with the variable-transparency layer in an opaque state according to one embodiment.

FIG. 6 illustrates the lens of the HMD system with the variable-transparency layer in a transparent state according to one embodiment.

DETAILED DESCRIPTION

Figure 1:
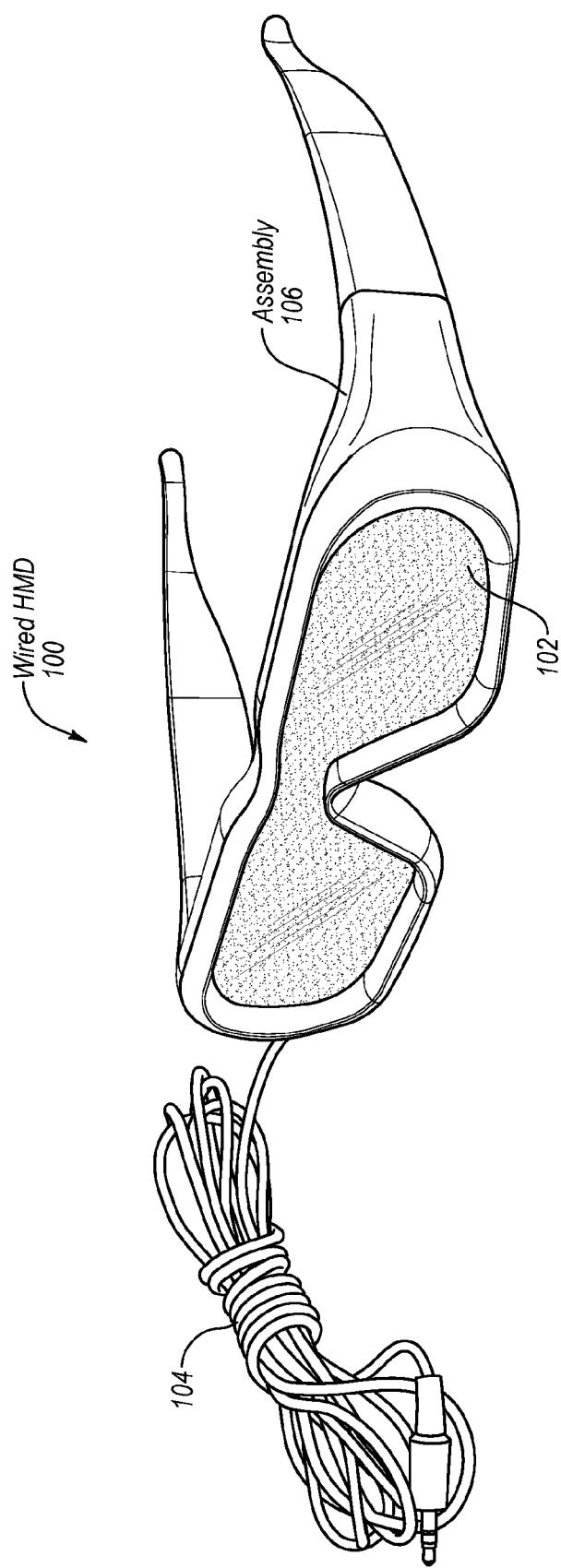
FIG. 1 is a perspective view of a wired HMD system with immersion control according to one embodiment.

Single-touch immersion control of head-mounted display (HMD) systems is described. One method outputs video from an electronic device to a HMD system that includes a display layer and a variable-transparency layer of variable-transparency material. Variable-transparency material is a substance that changes transparency when subject to charged electrodes or a burst of charge applied to the material. The variable-transparency layer may include variable-transparency glass, variable-transparency plastic, or other variable-transparency material. For example, the electronic device controls the variable-transparency layer to operate in a first state in which the variable-transparency layer is transparent and to operate in a second state in which the variable-transparency layer is opaque. The variable-transparency layer, when set to be transparent, has the property of transmitting light without appreciable scattering so that the bodies lying beyond are seen. It should be noted that when the variable-transparency layer is transparent it may be totally transparent or less than totally transparent where the variable-transparency layer can be seen through to a lesser degree. That is the transparency of the variable-transparency layer can be set as a matter of degree based on various factors, such as materials being used, settings of the level of transparency while in the transparent state, or the like. The variable-transparency layer can be controlled by the electronic device to set how limit an amount of light that passes through the HMD system for viewing images on the first display layer. The variable-transparency layer can be further controlled by the electronic device to increase the amount of light that passes through the HMD system for exposing a user of the HMD system to an outside-world view of the tablet device and surroundings as described herein. The electronic device switches between the second state and the first state in response to a single-touch event detected by the electronic device. One layer of the glasses would display video, computer-generated images (CGIs), virtual information, or any combination thereof on a transparent overlay. The second layer could be darkened and lightened based on a variable control, as directed by the electronic device as described herein. The electronic device can control immersion of a user in the display in the first layer of the glasses. The electronic device (also referred to herein as user device) may be any content rendering device that includes a wireless modem for connecting the user device to a network. Examples of such electronic devices include electronic book readers (e-readers), portable digital assistants, mobile phones, laptop computers, portable media players, tablet computers, cameras, video cameras, netbooks, notebooks, desktop computers, gaming consoles, DVD players, media centers, and the like. The user device may connect to a network to obtain content from a server computing system (e.g., an item providing system) or to perform other activities. The user device may connect to one or more different types of cellular networks, wireless area networks, or the like.

FIG. 1 is a perspective view of a wired HMD system 100 with immersion control according to one embodiment. The wired HMD system 100 includes a lens 102, a wire 104 and an assembly 106. The assembly 106 may be frames for glasses that hold or support the lens 102. The assembly 106 may be goggles. Alternatively, other assemblies may be used for the HMD system 100. The wire 104 connects the wired HMD system 100 to an electronic device (not illustrated in FIG. 1). For example, the wire 104 may include a standard or proprietary plug that plugs into a socket of the electronic device. The electronic device can include circuitry or software to detect when the wired HMD system 100 is plugged in for one or more various modes of operation of the electronic device. The wired HMD system 100 may include electronics to display the images on a first display layer and to control transparency of a second layer as described herein. The assembly 106 may house the display electronics as well as the communication circuitry for wired communication over the wire 104. The lens 102 of FIG. 1 (and FIG. 2) includes two layers as described in detail with respect to FIG. 3. One layer is a display layer for displaying images and another layer is for controlling the transparency of the lens 102. That is the second layer is controllable by an electronic device (e.g., tablet device) for immersion control as described herein.

Figure 2:
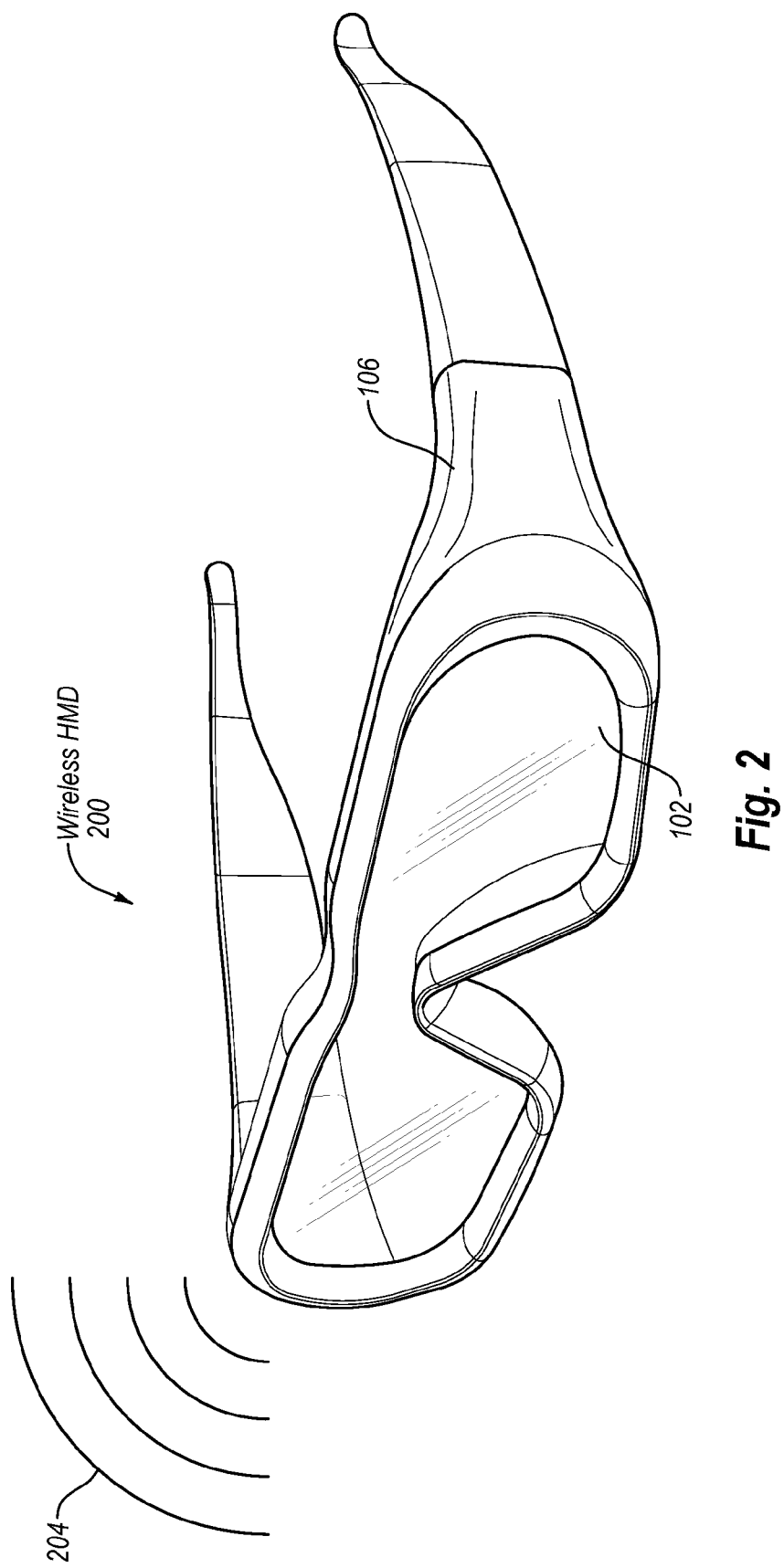
FIG. 2 is a perspective view of a wireless HMD system with immersion control according to another embodiment.

FIG. 2 is a perspective view of a wireless HMD system 200 with immersion control according to another embodiment. The wireless HMD system 200 includes the lens 102, assembly 106 and a wireless circuitry 204 (not illustrated) to wirelessly communicate with an electronic device (not illustrated in FIG. 2). Various wireless technologies may be used by the wireless HMD system 200 to communicate with the electronic device. The electronic device can also include circuitry or software to detect when the wireless HMD system 200 is within range and activated for one or more various modes of operation of the electronic device. The wireless HMD system 200 may include electronics to display the images on a first display layer and to control transparency of a second layer as described herein. For ease of description, the wired HMD system 100 and wireless HMD system 200 are hereinafter referred to as HMD system 200.

The lens 102 of FIG. 1 and FIG. 2 are illustrated as a single lens, but in other embodiments, the HMD system 200 can include multiple lenses, such as one lens for each eye. The shape and size of the glasses that hold the one or more lenses can also vary. The following description uses a single lens for purposes of description except for specifically noted.

Figure 3:
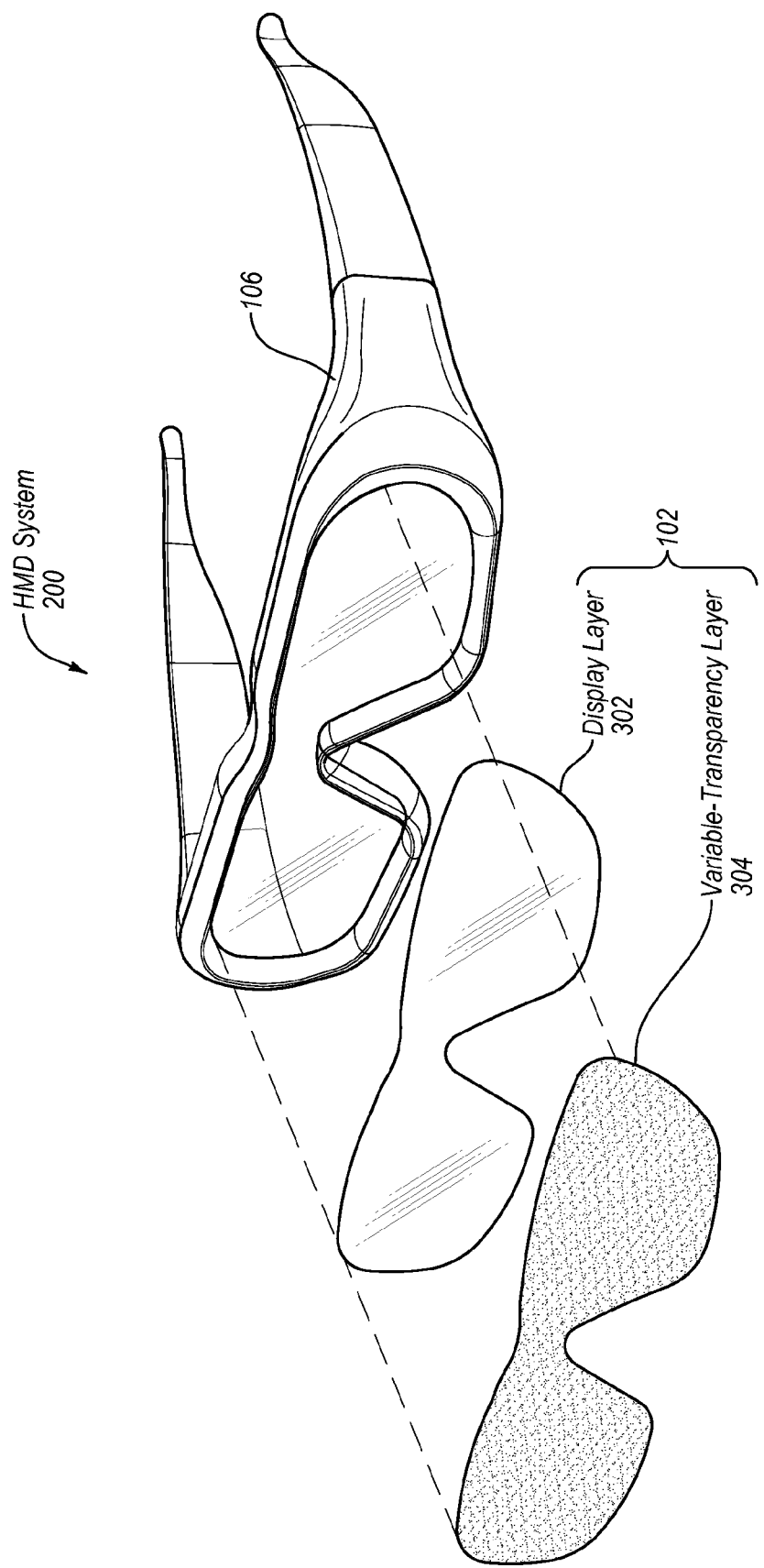
FIG. 3 is a perspective view of a wireless HMD system with a display layer and a variable-transparency layer in the lens according to one embodiment.

FIG. 3 is a perspective view of a HMD system 200 with a display layer 302 and a variable-transparency layer 304 in the lens 102 according to one embodiment. The lens 102 includes a display layer 302 with one or more display units. The display units may be miniaturized. In one embodiment, the one or more display units are LCD units. In another embodiment, LCos display units may be used. Alternatively, other display technologies can be used in the display layer. The display layer 302 may be transparent material in one embodiment. Alternatively, semi-transparent material can be used for the display layer 302. The display layer 302 can display images. These images may be 2D images, 3D images, or any combination thereof. For example, the display layer 302 can be used with 3D technologies to shutter one lens while displaying an image on the other lens, and then to display another image on the one lens while shuttering the other lens. The display layer 302 can display a computer-generated image (CGI) (also referred to as a virtual image), frames of a video, or a combination of both. For example, the HMD system can allow a CGI to be superimposed on a real-world view (augmented reality or mixed reality). Combining real-world view with CGI can be done by projected the CGI through a partially reflective minor and viewing the real world directly (called Optical See-Through). Combining real-world view with CGI can also be done electronically by accepting video from a camera and mixing it electronically with CGI (called Video See-Through). The camera may be a peripheral of the HMD system 200.

In one embodiment, the display layer 302 uses an optical mixer with a capability of reflecting artificial images as well as letting real images to cross the lens and let the user to look through it. The lens 102 can incorporate various optic technologies, such as curved minor or waveguide technologies, as well as diffraction optics, holographic optics, polarized optics, reflective optics, switchable waveguide, or the like. Regardless of the optic technologies and optic techniques, the display layer 302 is used to display images from the electronic device.

The lens 102 also includes a variable-transparency layer 304. The variable-transparency layer 304 may be variable-transparency glass, also referred to as Smart glass, Magic glass, or switchable glass. The variable-transparency layer 304 is electrically switchable glass (or plastic) or glazing which changes light transmission properties when voltage is applied. Certain types of variable-transparency layers 304 allow the electronic device to control the amount of light transmission. When activated, the variable-transparency layer 304 changes from transparent to translucent, partially blocking light while maintaining a clear view through the glass or the variable-transparency layer 304 changes from transparent to opaque, substantially or wholly blocking light through the glass. The variable-transparency layer 304 can use various technologies, including electrochromic devices, suspended particle devices and liquid crystal devices.

For example, electrochromic devices change light transmission properties in response to voltage and thus allow control over the amount of light passing through the lens 102. The electrochromic layer can change between a transparent state and an opaque state. In another embodiment, the electrochromic layer can change between a transparent state and a minor-like state (on an outer surface of the lens 102).

In suspended particular devices (SPDs), a thin film laminate of rod-like particles suspended in a fluid is placed between two glass or plastic layers, or attached to one layer. When no voltage is applied, the suspended particular are arranged in random orientations and tend to absorb light, so that the glass panel looks dark (or opaque), blue, grey, or black. When voltage is applied, the suspended particles align and let light pass.

In polymer dispersed liquid crystal devices (PDLCs), there is a liquid mix of polymer and liquid crystals placed between two layers of glass or plastic that each includes a thin layer of a transparent, conductive material to form a capacitor structure. Electrodes are attached to the transparent electrodes. With no applied voltage, the liquid crystals are randomly arranged in the droplets, resulting in scattering of light as it passes through the glasses. This may result in a milky white appearance. When a voltage is applied to the electrodes, the electric field formed between the two transparent electrodes on the glass causes the liquid crystals to align, allowing light to pass through the droplets with very little scattering and resulting in a transparent state. The degree of transparency can be controlled by the applied voltage.

In one embodiment, the variable-transparency layer 304 includes two lenses for an active shutter 3D system (also referred to as alternate frame sequencing, alternate image, AI, alternating field, field sequential or eclipse method). Active shutter 3D system is a technique of displaying stereoscopic 3D images by presenting the image intended for the left eye while blocking the right eye's view, then presenting the right-eye image while blocking the left eye, at a speed high enough to not be perceived by human sight, thus allowing the images to be perceived as fused into a single 3D image. Active shutter 3D systems generally use liquid crystal shutter glasses (also called LCS glasses, LCS 3D glasses, LC shutter glasses or active shutter glasses). Each eye's glass contains a liquid crystal layer which has the property of becoming opaque when voltage is applied, being otherwise transparent. The glasses are controlled by a timing signal that allows the glasses to alternately block one eye, and then the other, in synchronization with the refresh rate of the screen. The timing synchronization to the video equipment may be achieved via a wired signal, or wirelessly by either an infrared or radio frequency (e.g. Bluetooth, DLP link) transmitter. However, instead of controlling the active shutter 3D system to alternate darkening the lens for alternating eyes, the electronic device can control the two lenses together, transitioning the lenses between the opaque state and transparent state concurrently or simultaneously. In another embodiment, the variable-transparency layer 304 includes just the liquid crystal layer, typically used in active shutter 3D systems. It should be noted that in some embodiments, the variable-transparency layer 304 can include the active shutter 3D system (or the liquid crystal layer us to shutter the lens) and the display layer 302 can include the active shutter 3D system to enable displaying 3D images (shuttering the lenses in the display layer), while the variable-transparency layer 304 is activated in the transparent state or the opaque state (also referred to herein as the immersion state).

In one embodiment, the variable-transparency layer 304 is variable-transparency glass. In other embodiment, the variable-transparency layer 304 can be a coating or a glazing of variable-transparency material that changes light transmission properties in response to signals from the electronic device. It should be noted that the variable-transparency layer 304 can include one or more sheets of material. For example, the variable-transparency layer 304 can be produced by means of lamination of two or more glass or polycarbonate sheets.

The HMD system 200 may display different images for the left eye and the right eye for depth perception. There are multiple ways to provide these separate images: including 1) using dual video inputs, thereby providing a completely separate video signal to each eye; 2) time-based multiplexing in which techniques such as frame sequential combine two separate video signals into one signal by alternating the left and right images in successive frames; 3) side-by-side or top-bottom multiplexing in which half of the image is allocated to the left eye and the other half of the image to the right eye. It should also be noted that all HMD systems provide depth perception and can be binocular devices where both eyes are presented with the same image.

The HMD system 200 may include one or more peripherals associated with the lens 102 (or lenses). For example, the HMD system 200 can incorporate a positioning system that tracks the wearer's head position and angle, so that the picture or symbol displayed is congruent with the outside world using see-through imagery. The HMD system 200 may also include head tracking for slaving the imagery. Head-mounted displays may also be used with tracking sensors that allow changes of angle and orientation to be recorded. When such data is available in the system computer, it can be used to generate the appropriate CGI for the angle-of-look at the particular time. This allows the user to "look around" a virtual reality environment simply by moving the head without the need for a separate controller to change the angle of the imagery. In radio-based systems (compared to wires), the wearer may move about within the tracking limits of the system. The HMD system 200 may also include eye tracking. Eye trackers measure the point of gaze, allowing a computer to sense where the user is looking. This information is useful in a variety of contexts such as user interface navigation by sensing the user's gaze, a computer can change the information displayed on a screen, bring additional details to attention, etc. The HMD system 200 may also include hand tracking that tracks hand movement from the perspective of the HMD system allows natural interaction with content and a convenient game-play mechanism. The HMD system can also include one or more input devices, such as touchpads, touch buttons, buttons, or other input devices. The HMD system 200 can also include speech recognition, gesture recognition, or the like. The HMD system 200 can also include a camera for capturing images (e.g., still photos or video).

Figure 4:
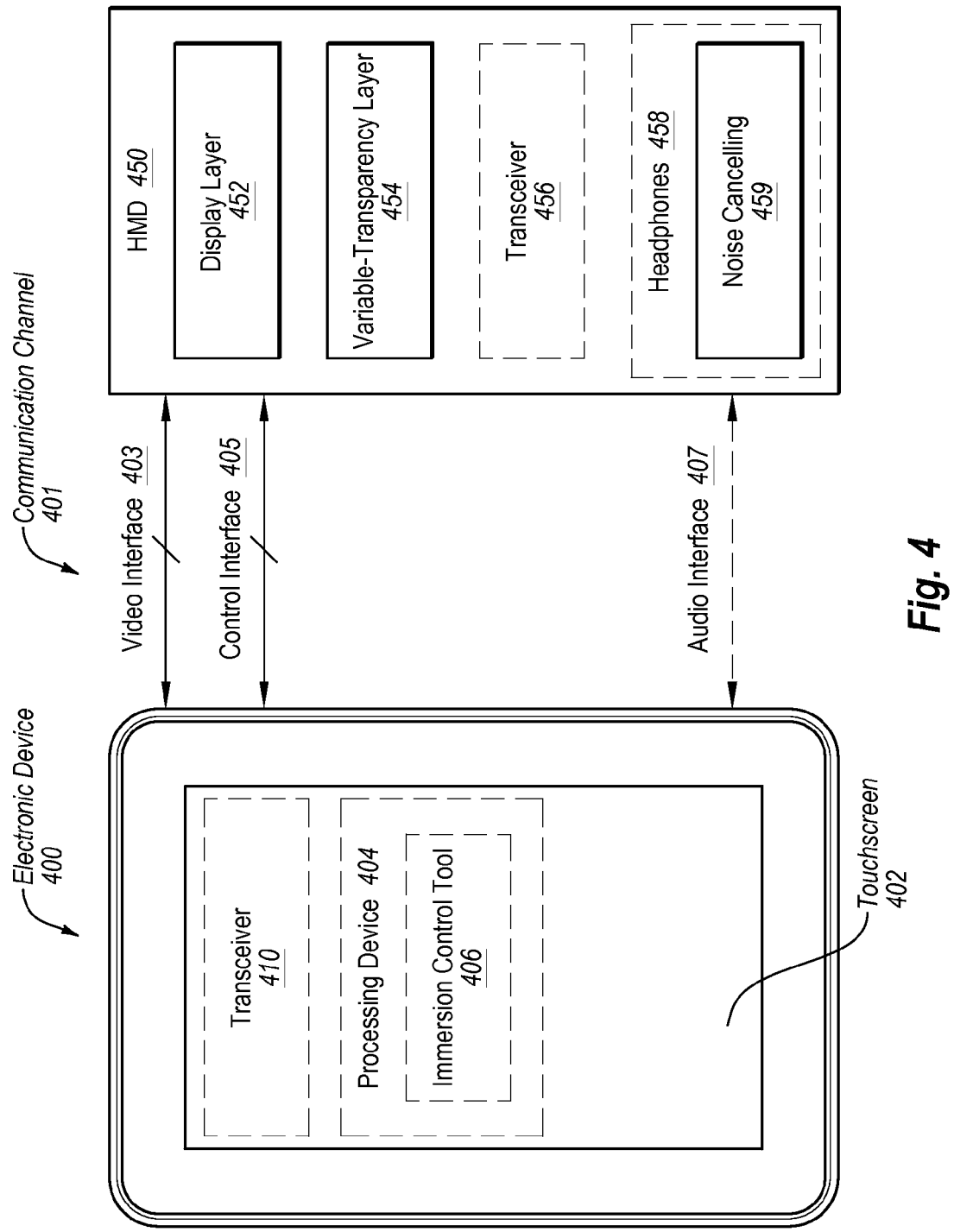
FIG. 4 is a block diagram of an electronic device with an immersion control tool for controlling an HMD system with the two layers according to one embodiment.

FIG. 4 is a block diagram of an electronic device 400 with an immersion control tool 406 for controlling an HMD system 450 with the two layers 452, 454 according to one embodiment. In the depicted embodiment, the electronic device 400 is a tablet device with a touchscreen 402. In other embodiments, other types of electronic devices that consume media items may include the immersion control tool 406. Among these electronic devices are electronic book readers, cellular telephones, PDAs, portable media players, netbooks, laptops and the like.

The electronic device 400 also includes a processing device 404. The processing device 404 may be a processor, a microprocessor, a microcontroller, a special-purpose processor, a digital signal processor ("DSP"), an application specific integrated circuit ("ASIC"), a field programmable gate array ("FPGA"), or the like. In one embodiment, the processing device 404 executes the immersion control tool 406 to perform one or more of the operations described herein, such as the touch to wake operations and touch to immerse operations in FIGS. 7-9. Although illustrated as being executed by the processing device 404, the immersion control tool 406 can be implemented as processing logic comprising hardware (circuitry, dedicated logic, etc.), software (such as is run on a general purpose computing system or a dedicated machine), firmware (embedded software), or any combination thereof.

As described herein, the electronic device 400 can output video (or any type of images) on a video interface 403 via a communication channel 401 with the HMD 450. The HMD system 450 includes a display layer 452 to display the video (or images) and a variable-transparency layer 454 which can be toggled between a transparent state and an opaque state by the immersion control tool 406. For example, the variable-transparency layer 454 is in the opaque state in a first mode while the video is displayed on the display layer 452 in the first mode. The electronic device 400 can detect a touch event that indicates that a user has touched a touch surface of the electronic device 400, such as the touchscreen 402, while in the first mode. In one embodiment, the touchscreen 402 can send or record an indication of the touch event and the immersion control tool 406 can receive or read the indication of the touch event. In response to the touch event, the immersion control tool 406 can output a first control signal to the HMD system 450 over a control interface 405 via the communication channel 401. The first control signal transitions the variable-transparency layer 454 to the transparent state in a second mode.

In one embodiment, the communication channel 401 is a wireless communication channel. The electronic device 400 includes a transceiver 410 and the HMD system 450 includes a transceiver 456 to establish the wireless communication channel between the devices. A transceiver 410 (and 456) is a device including both a transmitter and a receiver. The transceivers may be radio frequency (RF) transceivers. Alternatively, other types of transceivers and communication channels can be for communication between the two devices. In another embodiment, the electronic device 400 may include a transmitter and the HMD system 450 includes a receiver for the communication channel 401. In another embodiment, the communication channel 401 is a wired communication channel, such as a wired communication channel between HMD system 100 and the electronic device 400. It should be noted that communication channel 401 is illustrated as including the video interface 403, control interface 405 and audio interface 407. In other embodiments, a single interface can be used to send the image data and the control data (or signals). In other embodiments, various communication channels may be used for the multiple interfaces. Various configurations of transmitting and receiving the images and the control data (or signals) between the devices can be used.

As described herein, one of the problems people have with tablet devices is the lack of the ability to immerse in a tablet experience (e.g. watching a movie on an airplane). Conventional head mounted goggle systems, which are opaque, do not readily allow a user to reengage with the outside world. The immersion control tool 406 can be used with the HMD system 450, which may be a head-mounted goggles accessory for the tablet device. The accessory contains glasses capable of display images, as well as potentially headphones for audio. The glasses would have the two layers 452; the display layer 452 would display virtual information on a transparent overlay and the second layer 454 would darken or lighten based on a variable control by the immersion control tool 406. The immersion control tool 406 essentially controls the user's immersion in the display in the first layer of glasses by controlling the transparency of the second layer.

In one embodiment, the immersion control tool 406 controls a state of the variable-transparency layer 454. The immersion control tool 406 can transition the variable-transparency layer 454 between an opaque state and a transparent state. FIG. 5 illustrates a lens of a HMD system with the variable-transparency layer in an opaque state 500 according to one embodiment. FIG. 6 illustrates the lens of the HMD system with the variable-transparency layer in a transparent state 600 according to one embodiment. The immersion control tool 406 can transition in a discrete manner, such as by turning the opaque state 500 on and off. The immersion control tool 406 can transition from the opaque state 500 to the transparent state 600, and vice versa, in a gradual manner to provide a dimming effect. In another embodiment, the immersion control tool 406 can gradually control a transparency metric of the variable-transparency layer 454 to gradually control the transparency of the variable-transparency layer 454 between different levels.

The immersion control tool 406 can perform one or more operations to bring a user out of an immersion mode of the HMD system 450 with a single touch. For example, the immersion control tool 406 can provide a touch-to-wake feature. For example, imagine the user is watching a movie on their HMD system 450, and are completely immersed, but holding their tablet device 400. The user could simply touch the screen of their tablet (i.e., touchscreen 402) to clear both layers 452, 454, instantly exposing them to outside world and allowing them to use their tablet normally. Similarly, the immersion control tool 406 can provide a touch-to-immerse feature. For example, imagine the user starts playing a movie in full screen. The immersion control tool 406 immediately transitions the HMD system 450 to a fully immersive experience, blacking out the user's surroundings gradually with the variable-transparency layer 454 like when the lights go dark in a movie theater. Further, if the HMD system 450 includes headphones or separate headphones 458 are coupled with the electronic device 400, the immersion control tool 406 can activate noise canceling operations 459 of the headphones 458 in response to the touch-to-immerse event. As noted, in some embodiments, the headphones 458 can be integrated in the HMD system 450. Once in the immersion mode, the user can manually adjust their immersion via tactile controls or gestures on the tablet device or the HMD system 450 itself. The immersion control tool 406 allows glasses of the HMD system 450 to toggle between transparent and immersive modes.

In one embodiment, the electronic device 400 includes the video interface 403 to output images to the HMD system 450 in a first mode. The variable-transparency layer 454 is in an opaque state in the first mode and the images are displayed on the display layer 452 in the first mode. The electronic device 400 can output control signals to the HMD system 450 via the control interface 405 to control the variable-transparency layer 454. The processing device 404 is coupled to the video interface 403 and the control interface 405 and controls the variable-transparency layer 454 to operate in a first state in which the variable-transparency layer is transparent in a second mode and controls the variable-transparency layer 454 to operate in a second state in which the variable-transparency layer 454 is opaque in the first mode. The processing device 404 detects a touch event, such as a single-touch event as described herein, and switches the variable-transparency layer 454 between the second state and the first state in response to the touch event. For example, in response to a touch-to-wake event, the processing device 404 transitions the variable-transparency layer 454 from the opaque state in an immersion mode to the transparent state in a non-immersion mode using one or more control signals over the control interface 405. Similarly, in response to a touch-to-immerse event, the processing device 404 transitions the variable-transparency layer 454 from the transparent state to the opaque state using one or more control signals over the control interface 405.

In a further embodiment, the processing device 404 (or immersion control tool 406) detects a first touch event that indicates a user has touched a touch surface of the electronic device 400 for the single-touch event and switches the variable-transparency layer 454 from the second state to the first state in response to the first touch event. In another embodiment, the processing device 404 (or immersion control tool 406) detects a second touch event that indicates that the user has started playback of a video in a full-screen mode as the single-touch event and switches the variable-transparency layer 454 from the first state to the second state in response to the second touch event. In a further embodiment, the processing device 404 (or immersion control tool 406) gradually adjusts a transparency metric of the variable-transparency layer 454 when switching between the first state and the second state.

In a further embodiment, the electronic device 400 includes the audio interface 407 to output audio to the headphones 458 in the first mode. The processing device 404 can activate the noise canceling operations 459 of the headphones 458 over the audio interface 407 in response to the touch event detected by the processing device 404. Alternatively, the noise canceling operations 459 may be activated over the control interface 405 when the headphones 458 are integrated in the HMD system 450. Similarly, the processing device 404 can deactivate the noise canceling operations 459 over the audio interface 407 (or control interface 405) in response a touch-to-wake event.

The following methods may be performed by processing logic that may comprise hardware (circuitry, dedicated logic, etc.), software (such as is run on a general purpose computing system or a dedicated machine), firmware (embedded software), or any combination thereof.

Figure 7:
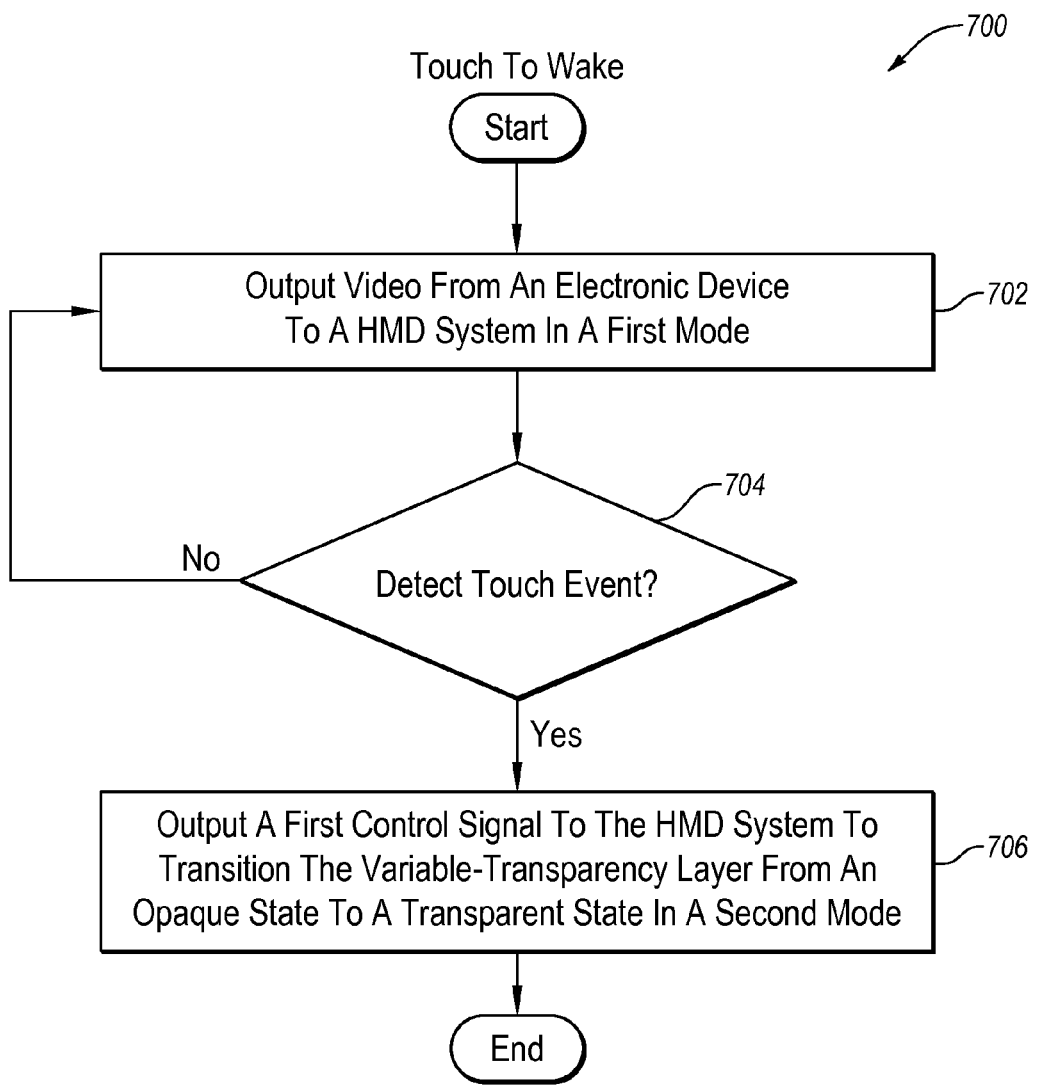
FIG. 7 is a flow diagram of an embodiment of a method of operating a user device with a touch-to-wake feature according to one embodiment.

FIG. 7 is a flow diagram of an embodiment of a method 700 of operating a user device with a touch-to-wake feature according to one embodiment. The method 700 begins with processing logic outputting video from an electronic device to a HMD system in a first mode (block 702). At block 702, the processing logic determines if a touch event is detected. If not touch event is detected, the processing logic returns to block 702 and continues outputting video to the HMD system in the first mode. If a touch event is detected at block 704, the processing logic outputs a first control signal to the HMD system to transition the variable-transparency glass layer from an opaque state to a transparent state in a second mode (block 706), and the method 700 ends. In the opaque state, the variable-transparency glass layer can be set to be opaque to limit an amount of light that passes through the HMD system for viewing the video (images) on the first display layer. In one embodiment, the outputting of the images and the setting the variable-transparency glass layer can be performed while the device (e.g., tablet device) is in a first mode in which an entire touch surface of the device is configured to operate as a touch-sensitive button. In the transparent state, the variable-transparency glass layer can be set to be transparent to increase the amount of light that passes through the HMD system for exposing a user of the HMD system to an outside-world view of the device (e.g., a tablet device) and its surroundings. The first display layer can also be set to be transparent. In a further embodiment, the processing logic can output a second control signal to headphones (as part of, or separate from, the HMD system) to deactivate noise canceling operations of the headphones.

In another embodiment, the processing logic displays video on a first display layer of a HMD system in an immersion mode in which a second display layer of the HMD system is set to an opaque state. For example, the processing logic can be implemented in a tablet device. The tablet device detects a touch event that indicates a user has touched a touch surface of the tablet device while in the immersion mode. The tablet device clears both the first display layer and the second display layer to be transparent to expose the user to an outside-world view of the tablet device in response to the touch event. The outside-world view allows the user to use their electronic device normally and allows the user to reengage with the outside world. In a further embodiment, the tablet device clears the layers by turning off the video in the first display layer and lightening the second display layer in response to the touch event to be transparent in the non-immersion mode.

In a further embodiment, the tablet device detects an immersion event while in the non-immersion mode. The tablet device darkens the second display layer of the HMD system to the opaque state from a transparent state and displays the video on the first display layer in response to the immersion event. In one embodiment, the immersion event is an event that indicates that the user has started playback of the video in a full-screen mode while in the non-immersion mode. In a further embodiment, the tablet device activates noise canceling operations of headphones in response to the immersion event.

In another embodiment, the processing logic outputs images from an electronic device to a display layer of a HMD system coupled to the electronic device. The processing logic controls a variable-transparency layer of the HMD system to operate in a first state in which the variable-transparency layer is set at a first transparency level. The first transparency level allows a first amount of light to pass through the variable-transparency layer. The processing logic also controls the variable-transparency layer to operate in a second state in which the variable-transparency layer is set to a second transparency level. The second transparency level allows a second amount of light to pass through the variable-transparency layer. The second amount of light is less than the first amount of light. The processing logic detects a touch event by the electronic device and switches the variable-transparency layer between the second state and the first state in response to the touch event.

In a further embodiment, the processing logic controls the display layer to be transparent while the variable-transparency layer is in the first state. In one embodiment, the processing logic stops the outputting of the images to the display layer. In another embodiment, the processing logic outputs the images to the display layer while the variable-transparency layer is in the second state.

In a further embodiment, the processing logic displays an image on the display layer of a first lens of the HMD system while shuttering the display layer of a second lens of the HMD system and then displays another image on the display layer of the second lens while shuttering the display layer of the first lens.

In another embodiment, the processing logic, while the electronic device is in a first mode in which an entire touch surface of the electronic device is configured to operate as a touch-sensitive button, detects the touch event. In response to the first touch event, the processing logic switches the variable-transparency layer from the second state to the first state. In a further embodiment, in which the images are frames of a video and in which the electronic device is in a second mode in which the entire touch surface of the electronic device is not configured to operate as the touch-sensitive button, the processing logic detects a second touch event. In response to the second touch event, the processing logic switches the variable-transparency layer from the first state to the second state and outputs the images from the electronic device to the display layer.

Figure 8:
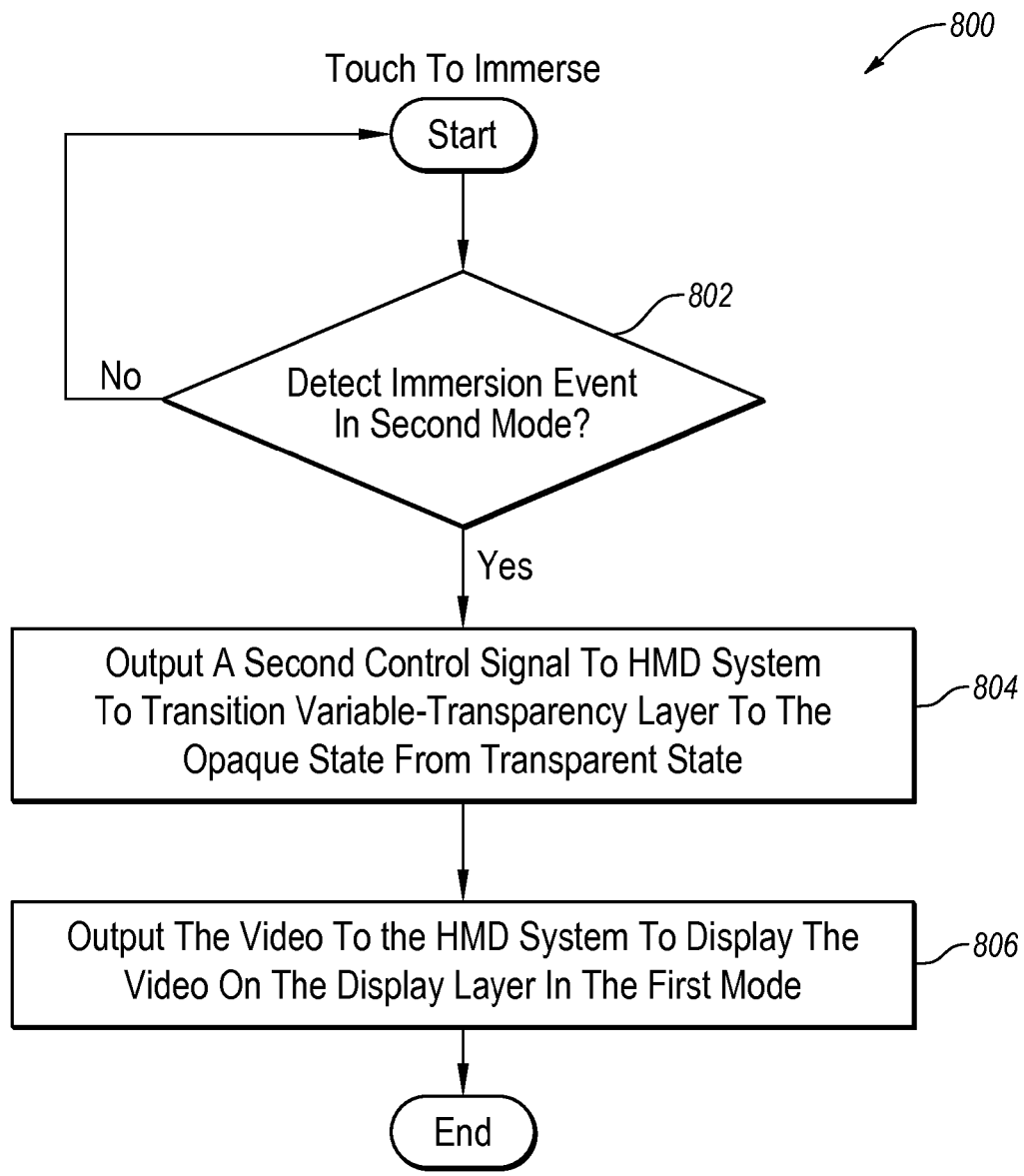
FIG. 8 is a flow diagram of an embodiment of a method of operating a user device with a touch-to-immerse feature according to one embodiment.

FIG. 8 is a flow diagram of an embodiment of a method 800 of operating a user device with a touch-to-immerse feature according to one embodiment. The method 800 begins with processing logic detecting an immersion event in a second mode (block 802). The immersion event may be in response to a single-touch event on the tablet device, such as touching a specific user interface element to activate immersion mode, in response to a mechanical switch, or the like. For example, a user can activate the immersion feature by activating a widget on a video player displayed on the tablet device, or when the user activates the video to be displayed in a full-screen mode or a full-immersion mode when the HMD system is connected and active. If no immersion event is detected at block 802, the processing logic continues normal operation. When the immersion event is detected at block 802, the processing logic outputs a second control signal to the HMD system to transition the variable-transparency glass layer to the opaque state from the transparent state (block 804). The processing logic outputs the video to the HMD system to display the video on the display layer in the first mode (block 806), and the method 800 ends.

Figure 9:
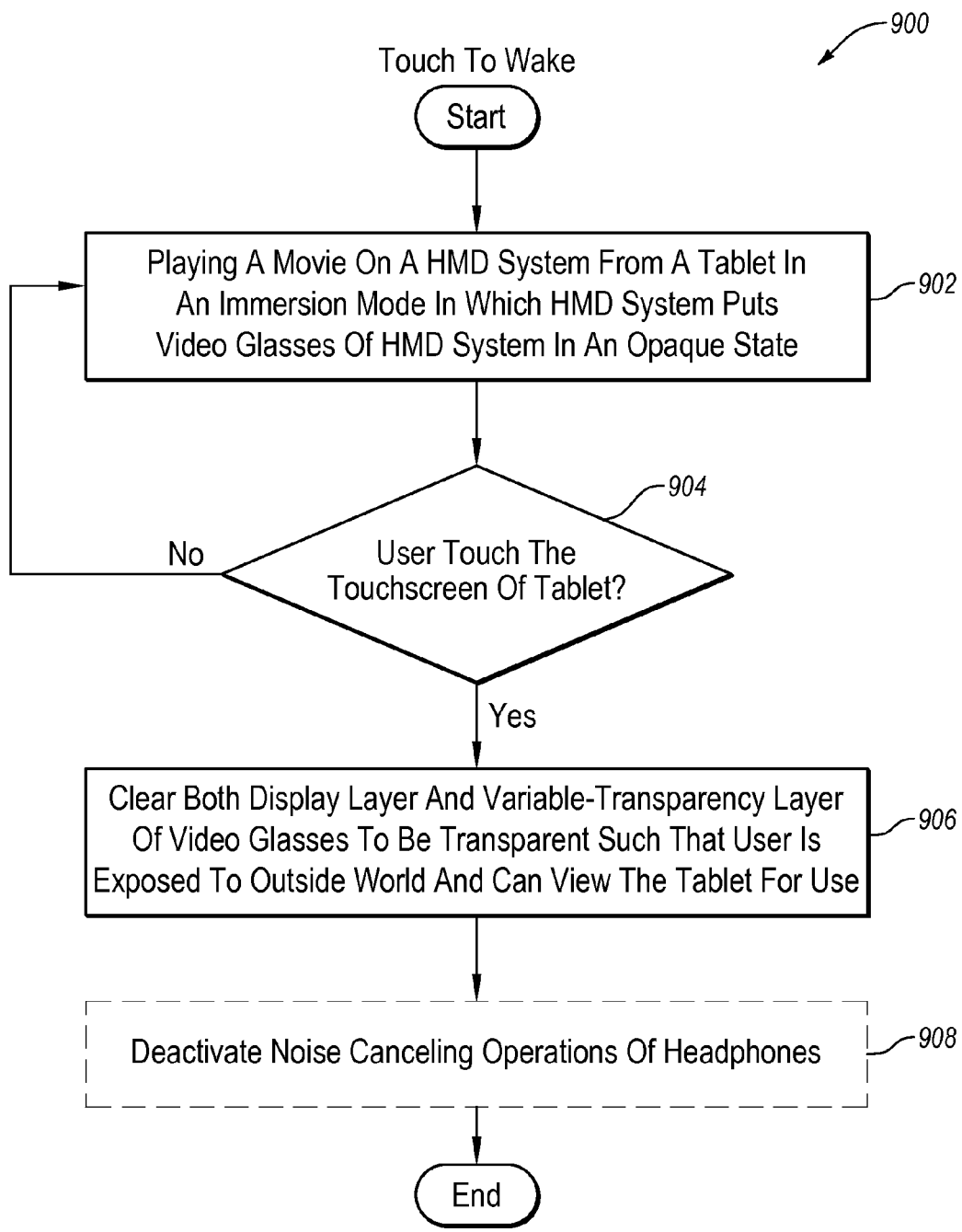
FIG. 9 is a flow diagram of an embodiment of a method of operating a user device with a touch-to-wake feature according to another embodiment.

FIG. 9 is a flow diagram of an embodiment of a method 900 of operating a user device with a touch-to-wake feature according to another embodiment. The method 1300 begins with processing logic playing a movie on a HMD system from a tablet device in an immersion mode in which the HMD system puts video glasses in an opaque state (block 902). The processing logic determines whether the user touches the touchscreen of the tablet device (block 904). If the user does not touch the touchscreen of the tablet device at block 904, the processing logic continues at block 902. When the user touches the touchscreen at block 904, the processing logic clears both a display layer and a variable-transparency layer of video glasses of the HMD system to be transparent such that the user is exposed to the outside world and can view the tablet device for use (block 906). In a further embodiment, the processing logic optionally deactivates noise canceling operations of headphones (block 908), and the method 900 ends.

In another embodiment, the processing logic outputs video to a first display layer of a HMD system coupled to the tablet device. While displaying the video on the first display layer, the processing logic sets a second display layer of the HMD system to be opaque to limit an amount of light that passes through the HMD system for viewing the video on the first display layer. The outputting and the setting operations may be performed by the tablet device while the tablet device is in a first mode in which an entire touch surface of the tablet device is configured to operate as a touch-sensitive button. The processing logic detects a touch event on the touch surface when the tablet device is configured to operate as the touch-sensitive button. In response to the detected touch event, the processing logic sets the second display layer to be transparent to increase the amount of light that passes through the HMD system for exposing a user of the HMD system to an outside-world view of the tablet device in response to the detected touch. The processing logic sets the first display layer to be transparent.

Figure 10:
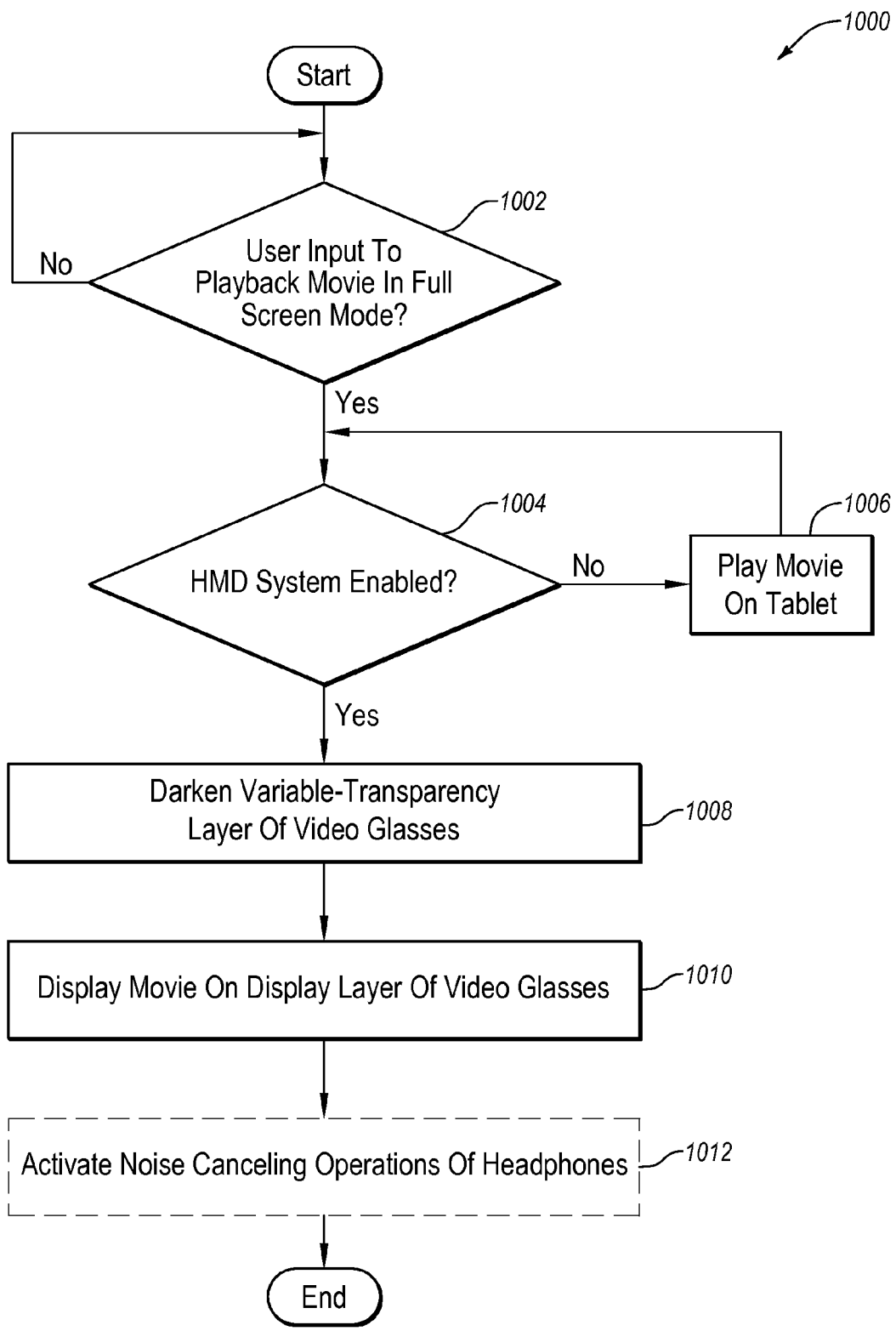
FIG. 10 is a flow diagram of an embodiment of a method of operating a user device with a touch-to-immerse feature according to another embodiment.

FIG. 10 is a flow diagram of an embodiment of a method 1000 of operating a user device with a touch-to-immerse feature according to another embodiment. The method 1000 begins with processing logic determines whether user input is received to playback a move in full-screen mode (block 1002). When the processing logic receives the user input at block 1002, the processing logic determines if the HMD system is enabled (block 1004). If not, the processing logic plays the movie on the tablet device (block 1006) and returns to periodically determine if the HMD system is enabled. When the HMD system is enabled at block 1004, the processing logic darkens a variable-transparency layer of the video glasses of the HMD system (block 1008) and displays the movie on a display layer of the video glasses (block 1010). In a further embodiment, the processing logic optionally activates noise canceling operations of headphones (block 1012), and the method 1000 ends.

In one embodiment, the electronic device 400 performs the methods 700, 800, 900 and 1000. In another embodiment, the processing device 404 performs the methods 700, 800, 900 and 1000. In another embodiment, the immersion control tool 406 performs the methods 700, 800, 900 and 1000. Alternatively, other components of the electronic device 400 or user device 1105 perform some or all of the operations of methods 700, 800, 900 and 1000.

In another embodiment, the processing logic outputs video (as video data or video signals) from an electronic device to a HMD system in a first mode. The HMD system includes a display layer to display the video and a variable-transparency glass layer includes a transparent state and an opaque state. The variable-transparency glass layer is in the opaque state in the first mode and the video is displayed on the display layer in the first mode. The processing logic detects a touch event that indicates a user has touched a touch surface of the electronic device while in the first mode. For example, the processing device receives an indication from the touchscreen device that the user has touched the touchscreen. The processing logic outputs a first control signal from the electronic device to the HMD system to transition the variable-transparency glass layer to the transparent state in a second mode in response to the touch event.

In a further embodiment, the processing logic outputs a second control signal from the electronic device to the HMD system to turn off the video in the display layer in response to the touch event. The display layer is transparent in the second mode. In one embodiment, the display layer and variable-transparency glass layer are transparent in the second mode and the processing logic detects an immersion event while in the second mode. The processing logic outputs a second control signal from the electronic device to the HMD system to transition the variable-transparency glass layer to the opaque state in response to the immersion event and outputs the video from the electronic device to the HMD system to display the video on the display layer in the first mode. In one embodiment, the immersion event is an event that indicates that the user has started playback of the video in a full-screen mode while in the second mode. In another embodiment, the immersion event is a single-touch event that indicates that the user desires to enter immersion mode. In a further embodiment, the processing logic outputs a third control signal from the electronic device to headphones to activate noise canceling operations of the headphones in response to the immersion event.

In another embodiment, the processing logic outputs images from an electronic device to a HMD system, which includes a display layer and a variable-transparency layer. The processing logic controls the variable-transparency layer to operate in a first state in which the variable-transparency layer is transparent and controls the variable-transparency layer to operate in a second state in which the variable-transparency layer is opaque. The processing logic switches the variable-transparency layer between the second state and the first state in response to a single-touch event detected by the electronic device.

In a further embodiment, the processing logic controls the display layer to turn off the images in the first state. The images are displayed on the display layer in the second state. In one embodiment, the processing logic detects a first touch event that indicates a user has touched a touch surface of the electronic device for the single-touch event. The processing logic switches the variable-transparency layer from the second state to the first state in response to the first touch event. In another embodiment, the processing logic detects a second touch event that indicates that the user has started playback of the video in a full-screen mode as the single-touch event. The processing logic switches the variable-transparency layer from the first state to the second state in response to the second touch event. In a further embodiment, the processing logic outputs audio from the electronic device to headphones and activates noise canceling operations of the headphones in response to the second touch event. In another embodiment, the processing logic sets the headphones to a predefined volume level in response to the second touch event.

In a further embodiment, the processing logic, when switching between states, gradually adjust a transparency metric of the variable-transparency layer when transitioning between the first state and the second state.

In another embodiment, the processing logic detects the single-touch event. For example, the processing logic receives an indication from a touch device, such as a touch-screen that the user has touched a touch surface. In another embodiment, the processing logic receives an indication that the HMD system has detected the single-touch event.

In a further embodiment, the processing logic sets the second display layer to be transparent and the first display layer to be transparent while the tablet device is in a second mode in which the entire touch surface is not configured to operate as the touch-sensitive button. The processing logic detects a second touch event while in the second mode. In response to the detected second touch event, the processing logic sets the second display layer of the HMD system to be opaque and outputs the video on the first display layer. In a further embodiment, the processing logic detects the second touch event when it detects that the user has started playback of the video in a full-screen mode.

Figure 11:
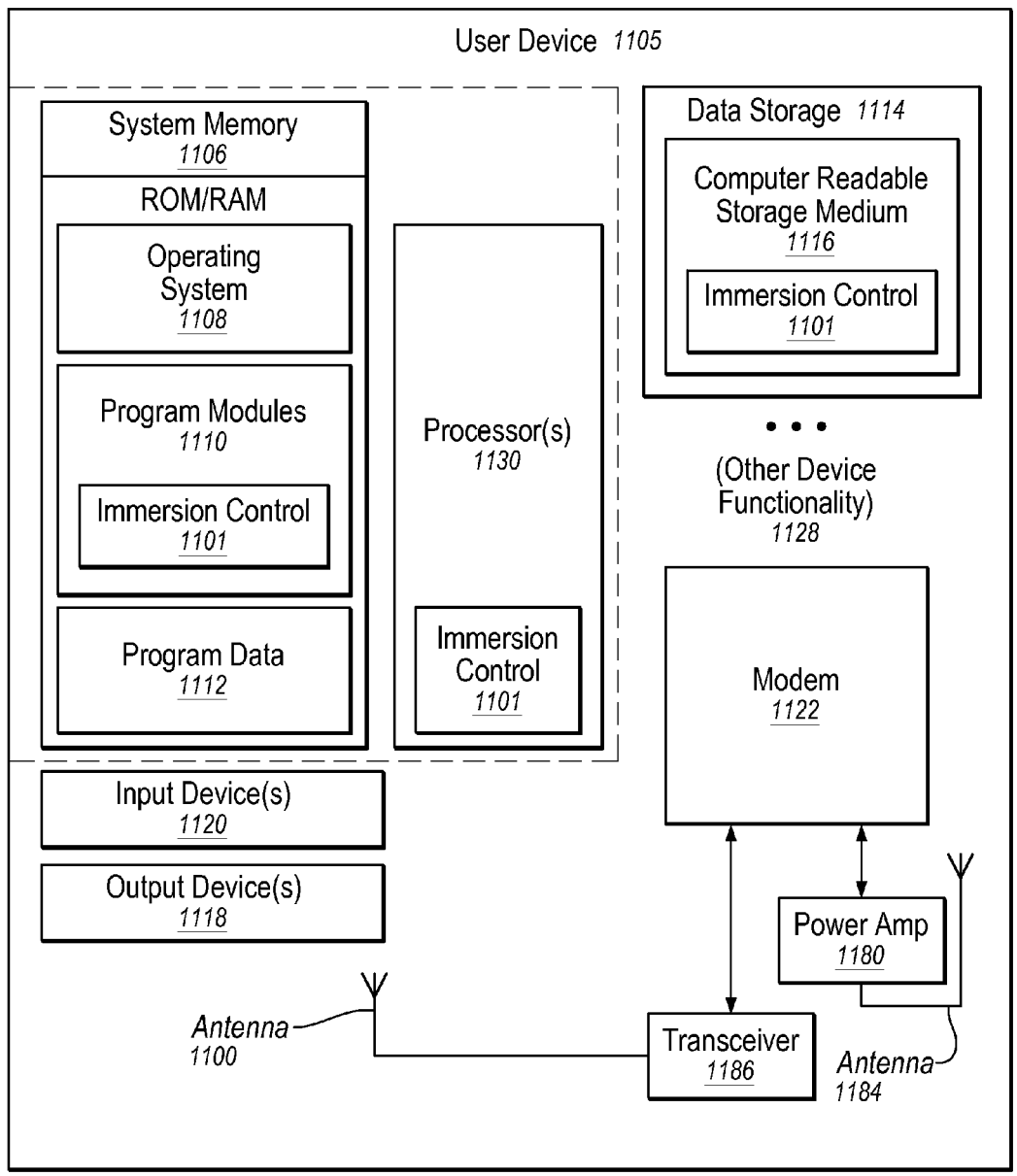
FIG. 11 is a block diagram of a user device having immersion control according to one embodiment.

FIG. 11 is a block diagram of a user device 1105 having immersion control 1101 according to one embodiment. The user device 1105 includes one or more processors 1130, such as one or more CPUs, microcontrollers, field programmable gate arrays, or other types of processing devices. The user device 1105 also includes system memory 1106, which may correspond to any combination of volatile and/or non-volatile storage mechanisms. The system memory 1106 stores information, which provides an operating system component 1108, various program modules 1110, including the immersion control 1101, program data 1112, and/or other components. The user device 1105 performs functions by using the processor(s) 1130 to execute instructions provided by the system memory 1106. The processor(s) 1130 can execute the immersion control 1101.

The user device 1105 also includes a data storage device 1114 that may be composed of one or more types of removable storage and/or one or more types of non-removable storage. The data storage device 1114 includes a computer-readable storage medium 1116 on which is stored one or more sets of instructions embodying any one or more of the functions of the user device 1105, as described herein. In one embodiment, the computer-readable storage medium 1116 includes the immersion control 1101. As shown, instructions may reside, completely or at least partially, within the computer readable storage medium 1116, system memory 1106 and/or within the processor(s) 1130 during execution thereof by the user device 1105, the system memory 1106 and the processor(s) 1130 also constituting computer-readable media. The user device 1105 may also include one or more input devices 1120 (keyboard, mouse device, specialized selection keys, etc.) and one or more output devices 1118 (displays, printers, audio output mechanisms, etc.).

The user device 1105 further includes a wireless modem 1122 to allow the user device 1105 to communicate via a wireless network (e.g., such as provided by a wireless communication system) with other computing devices, such as remote computers, an item providing system, and so forth. The wireless modem 1122 allows the user device 1105 to handle both voice and non-voice communications (such as communications for text messages, multimedia messages, media downloads, web browsing, etc.) with a wireless communication system. The wireless modem 1122 may provide network connectivity using any type of digital mobile network technology including, for example, cellular digital packet data (CDPD), general packet radio service (GPRS), enhanced data rates for GSM evolution (EDGE), UMTS, 1 times radio transmission technology (1xRTT), evaluation data optimized (EVDO), high-speed downlink packet access (HSDPA), WLAN (e.g., Wi-Fi® network), etc. In other embodiments, the wireless modem 1122 may communicate according to different communication types (e.g., WCDMA, GSM, LTE, CDMA, WiMax, etc.) in different cellular networks. The cellular network architecture may include multiple cells, where each cell includes a base station configured to communicate with user devices within the cell. These cells may communicate with the user devices 1105 using the same frequency, different frequencies, same communication type (e.g., WCDMA, GSM, LTE, CDMA, WiMax, etc), or different communication types. Each of the base stations may be connected to a private, a public network, or both, such as the Internet, a local area network (LAN), a public switched telephone network (PSTN), or the like, to allow the user devices 1105 to communicate with other devices, such as other user devices, server computing systems, telephone devices, or the like. In addition to wirelessly connecting to a wireless communication system, the user device 1105 may also wirelessly connect with other user devices. For example, user device 1105 may form a wireless ad hoc (peer-to-peer) network with another user device.

The wireless modem 1122 may generate signals and send these signals to power amplifier (amp) 1180 or transceiver 1186 for amplification, after which they are wirelessly transmitted via the antenna 1100 or antenna 1184, respectively. Although FIG. 11 illustrates power amp 1180 and transceiver 1186, in other embodiments, a transceiver may be used for all the antennas 1100 and 1184 to transmit and receive. Or, power amps can be used for both antennas 1100 and 1184. The antenna 1184, which is an optional antenna that is separate from the antenna 1100, may be any directional, omnidirectional or non-directional antenna in a different frequency band than the frequency bands of the antenna 1100. The antenna 1184 may also transmit information using different wireless communication protocols than the antenna 1100. In addition to sending data, the antenna 1100 and the antenna 1184 also receive data, which is sent to wireless modem 1122 and transferred to processor(s) 1130. It should be noted that, in other embodiments, the user device 1105 may include more or less components as illustrated in the block diagram of FIG. 11.

In one embodiment, the user device 1105 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of the antenna 1100 that operates at a first frequency band and the second wireless connection is associated with a second resonant mode of the antenna 1100 that operates at a second frequency band. In another embodiment, the first wireless connection is associated with the antenna 1100 and the second wireless connection is associated with the antenna 1184. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a single modem 1122 is shown to control transmission to both antennas 1100 and 1184, the user device 1105 may alternatively include multiple wireless modems, each of which is configured to transmit/receive data via a different antenna and/or wireless transmission protocol. In addition, the user device 1105, while illustrated with two antennas 1100 and 1184, may include more or fewer antennas in various embodiments.

The user device 1105 delivers and/or receives items, upgrades, and/or other information via the network. For example, the user device 1105 may download or receive items from an item providing system. The item providing system receives various requests, instructions and other data from the user device 1105 via the network. The item providing system may include one or more machines (e.g., one or more server computer systems, routers, gateways, etc.) that have processing and storage capabilities to provide the above functionality. Communication between the item providing system and the user device 1105 may be enabled via any communication infrastructure. One example of such an infrastructure includes a combination of a wide area network (WAN) and wireless infrastructure, which allows a user to use the user device 1105 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 1105.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1105 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1105 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
    outputting, by a tablet device, video to a first display layer of a head-mounted display (HMD) system coupled to the tablet device;
    while displaying the video on the first display layer, setting a second display layer of the HMD system to be opaque to limit an amount of light that passes through the HMD system for viewing the video on the first display layer, wherein the outputting and the setting are performed by the tablet device while the tablet device is in a first mode in which an entire touch surface of the tablet device is configured to operate as a touch-sensitive button;
    detecting, by the tablet device, a touch event on the touch surface when the tablet device is configured to operate as the touch-sensitive button; and
    in response to the detected touch event,
        setting, by the tablet device, the second display layer to be transparent to increase the amount of light that passes through the HMD system for exposing a user of the HMD system to an outside-world view of the tablet device in response to the detected touch event, and
        setting, by the tablet device, the first display layer to be transparent.

2. The method of claim 1, wherein the setting the first display layer to be transparent comprises:
    stopping the outputting of the video to the first display layer; and
    setting the first display layer in a transparent state.

3. The method of claim 1, wherein the setting the second display layer to be transparent and the first display layer to be transparent are performed by the tablet device while the tablet device is in a second mode in which the entire touch surface is not configured to operate as the touch-sensitive button, wherein the method further comprises:
    detecting, by the tablet device, a second touch event while in the second mode;
    in response to the detected second touch event,
        setting the second display layer of the HMD system to be opaque; and
        outputting the video on the first display layer.

4. The method of claim 3, wherein the detecting the second touch event comprises detecting that the user has started playback of the video in a full-screen mode.

5. A method comprising:
    outputting images from an electronic device to a display layer of a head-mounted display (HMD) system coupled to the electronic device;
    controlling, by the electronic device, a variable-transparency layer of the HMD system to operate in a first state in which the variable-transparency layer is set at a first transparency level, wherein the first transparency level allows a first amount of light to pass through the variable-transparency layer;
    controlling, by the electronic device, the variable-transparency layer to operate in a second state in which the variable-transparency layer is set to a second transparency level, wherein the second transparency level allows a second amount of light to pass through the variable-transparency layer, wherein the second amount of light is less than the first amount of light;
    detecting a touch event by the electronic device while at least a portion of a touch surface of the electronic device is configured to operate as a touch-sensitive button; and
    switching the variable-transparency layer between the second state and the first state in response to the touch event.

6. The method of claim 5, further comprising controlling, by the electronic device, the display layer to be transparent while the variable-transparency layer is in the first state, wherein the controlling the display layer comprises stopping the outputting the images to the display layer.

7. The method of claim 5, wherein the outputting images comprises outputting the images to the display layer while the variable-transparency layer is in the second state.

8. The method of claim 7, wherein the outputting the images further comprises:
    displaying an image on the display layer of a first lens of the HMD system while shuttering the display layer of a second lens of the HMD system; and
    displaying another image on the display layer of the second lens while shuttering the display layer of the first lens.

9. The method of claim 5, wherein,
    while the electronic device is in a first mode, an entire touch surface of the electronic device is configured to operate as the touch-sensitive button.

10. The method of claim 9, wherein the images are frames of a video, and wherein the method further comprises:
    while the electronic device is in a second mode in which the entire touch surface of the electronic device is not configured to operate as the touch-sensitive button, detecting, by the electronic device, a second touch event; and
    in response to the second touch event,
        switching the variable-transparency layer from the first state to the second state; and
        outputting the images from the electronic device to the display layer.

11. The method of claim 10, further comprising:
    outputting audio from the electronic device to headphones; and
    activating noise canceling operations of the headphones in response to the second touch event.

12. The method of claim 11, further comprising setting the headphones to a predefined volume level in response to the second touch event.

13. The method of claim 5, wherein the switching comprises gradually adjusting a transparency metric between the first transparency level and the second transparency level when transitioning between the first state and the second state.

14. The method of claim 5, wherein the variable-transparency layer comprises at least one of variable-transparency glass or variable-transparency plastic.

15. An electronic device comprising:
    a video interface to output images to a display layer of a head-mounted display (HMD) system, wherein the HMD system further comprises a variable-transparency layer;
    a control interface to output control signals to the HMD system to control at least the variable-transparency layer; and
    a processing device coupled to the video interface and the control interface, wherein the processing device is configured to execute an immersion control tool, wherein the immersion control tool is configured to:
control the variable-transparency layer to a first transparency level, wherein the first transparency level allows a first amount of light to pass through the variable-transparency layer;
control the variable-transparency layer to a second transparency level, wherein the second transparency level allows a second amount of light to pass through the variable-transparency layer;
detect a touch event while the electronic device is in a first mode in which at least a portion of a touch surface of the electronic device is configured to operate as a touch-sensitive button; and
in response to the detected touch event, switch the variable-transparency layer between the first transparency level and the second transparency level.

16. The electronic device of claim 15, further comprising an audio interface to output audio to headphones, and wherein the immersion control tool is further configured to activate noise canceling operations of the headphones in response to the touch event.

17. The electronic device of claim 15, wherein
an entire touch surface of the electronic device is configured to operate as the touch-sensitive button in the first mode.

18. The electronic device of claim 17, wherein the images are frames of a video, and wherein the immersion control tool is further configured to:
while the electronic device is in a second mode in which the entire touch surface of the electronic device is not configured to operate as the touch-sensitive button, detect a second touch event; and
in response to the second touch event, switch the variable-transparency layer from the second transparency level to the first transparency level.

19. The electronic device of claim 15, wherein the HMD system comprises a first lens and a second lens, wherein the processing device is configured to control the HMD system over the control interface to:
display an image on the display layer of the first lens while shuttering the display layer of the second lens; and
display another image on the display layer of the second lens while shuttering the display layer of the first lens.

20. The electronic device of claim 15, wherein the immersion control tool is further configured to gradually adjust a transparency metric of the variable-transparency layer when switching the variable-transparency layer between the first transparency level and the second transparency level.

* * * * *